United States Patent Office 3,295,591
Patented Jan. 3, 1967

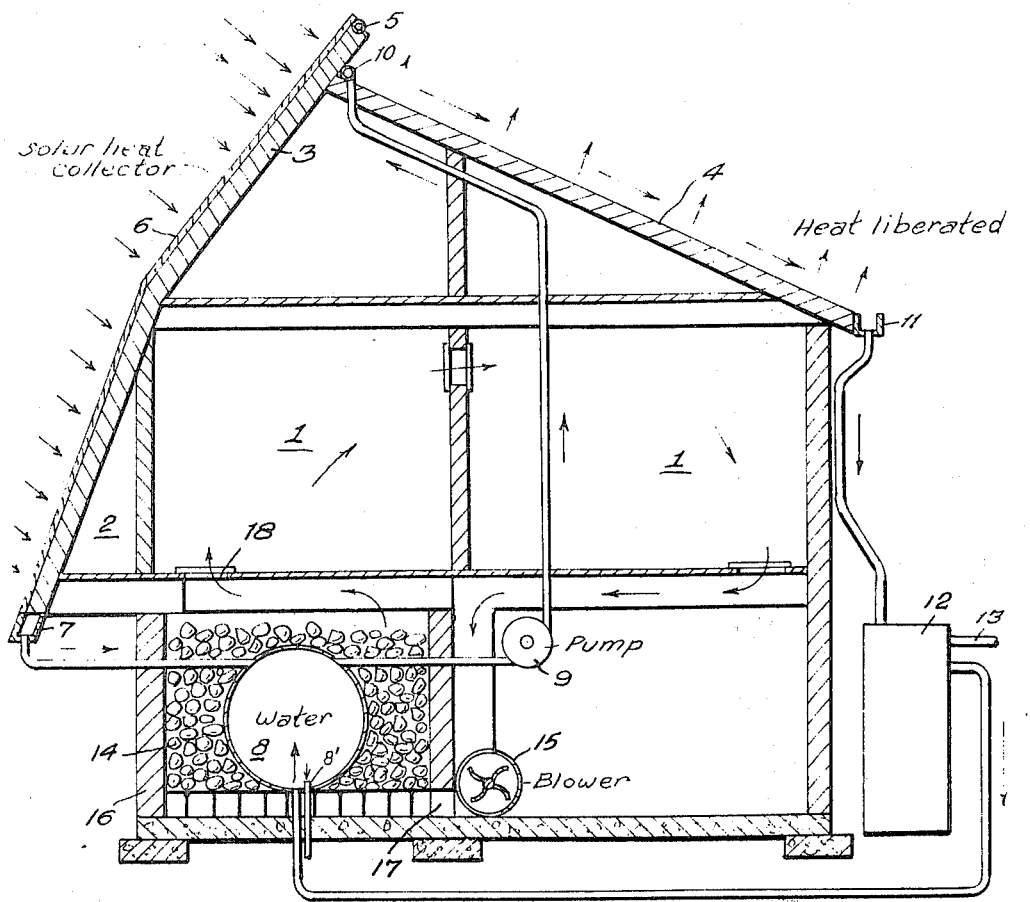

3,295,591
APPARATUS FOR COOLING AND SOLAR
HEATING A HOUSE
Harry E. Thomason, District Heights, Md.
(7354 Walker Mill Road SE., Washington, D.C. 20027)
Filed Sept. 9, 1965, Ser. No. 486,019
5 Claims. (Cl. 165—1)

This is a continuation-in-part application of my applications identified as follows: Combination Solar Heat Trap and Heat Dissipator, S.N. 804,932, April 8, 1959, Patent No. 3,254,701; Heat (or Cold) Storage Apparatus, S.N. 835,962, August 25, 1959, Patent No. 3,254,702.

The present invention relates primarily to cooling apparatus, including means for storing "coolness" (or heat). This permits the discharge of heat, preferably at night, and storage of "coolness" so produced to cool a home during the hot day. The heat may be discharged from the roof of a building, for example. Other uses for the apparatus are apparent.

The storage apparatus may be used in a reverse fashion to store heat produced by a solar heat collector if desired. The solar heat collector warms the storage apparatus on cold sunny days to warm a building, such as a home, on cold nights and during cloudy weather.

In the drawing the single figure illustrates the invention as applied to a home.

The home may have living space 1, closet area 2, a solar heat collector 3 and a roof section 4.

The solar heat collector may be the simple, low-cost and highly efficient type disclosed in Patents Nos. 3,145,707 and 3,215,134, or may be another type. Such patented collector has a perforated distributor pipe 5 and a transparent covering 6. Beneath the transparent covering is a blackened sheet (not shown) over which water flows. The sun warms the sheet and as the water flows thereover it becomes heated. The heated water is collected in gutter 7 for return to tank 8 from whence it flows through 8' and is pumped back to distributor manifold 5 by a pump and piping (not illustrated).

The heated water in tank 8 warms the tank walls and non-fluid material 14, such as stones, cans of heat-of-fusion salts, or such, in storage bin 16. The warmed water, tank and non-fluid storage material store large quantities of heat during sunny days to warm the home on cold nights and cloudy days during the winter.

For summertime air conditioning the warmer water from near the top of tank 8 may be pumped to the rooftop by pump 9 and distributed by perforated pipe 10. As the water flows down the roof, preferably during the cool night, it is cooled by radiation to the night sky, evaporation to the surrounding air or actual contact with cool night air, or by all of these phenomena. The cooled water is collected by gutter 11 from whence it preferably flows through sediment trap-automatic rainwater makeup device 12 back to the bottom of tank 8. The cooled water in tank 8 cools the walls of the tank and the non-fluid material therearound, thereby storing "coolness" in the water and non-fluid material.

When the air in area 1 becomes too warm a thermostat starts blower 15 to circulate air from area 1 through the cooled non-fluid material 14 and around cooled tank 8. This cools the air. The cooled air returns to area 1, by way of opening 18, to cool area 1.

Water from rain, snow or the like flows into tanks 8 and 12 until they are filled to the level of overflow 13 through which excess water may flow to the lawn or drainage ditch.

The fluid-filled tank 8 and non-fluid material 14 are preferably supported by a masonry distributor and ductwork system of bricks, building blocks or such as described and claimed in application S.N. 835,962 referred to above. Air from blower 15 is introduced to substantially air-tight, insulated bin 16 through one or more openings 17. The air passes through the masonry system, across the bin, up and out through cracks between the pieces of masonry. The rising air currents spiral up through the non-fluid material 14 and around tank 8 in heat exchange relationship with the large surface areas of material 14 and 8. If these materials have been heated, the air is warmed. If they have been cooled, the air is cooled. The air, thus heated for wintertime or cooled for summertime, is returned to area 1 through one or more openings 18. No refrigeration compressor is required, pump 9 requiring only about ¼ H.P. to bring about the cooling function in a typical installation as described in the "Solar Energy" journal, vol. IV, November 4, October 1960, pages 11–19.

Simplicity and low cost operation, high efficiency and low cost of the apparatus are salient features of the invention.

I claim:
1. Apparatus for cooling a building which comprises: storage means for storing liquid such as water; liquid in said storage means; means for circulating said liquid to apparatus outside of the building to bring the liquid directly into contact with outside air to lower the temperature of the liquid by evaporation, or radiation, or contact with air cooler than the liquid, or by all of these phenomena; means for retrieving the cooled liquid and returning it to the storage means; non-liquid "cool" storage means substantially surrounding and in heat-exchange relationship with the liquid means whereby the cooled liquid means will cool the non-liquid means; insulation means to minimize loss of "coolness" from the cooled liquid and the cooled non-liquid "cool" storage means; and means to circulate air from space inside the building in heat-exchange relationship through and around the cooled storage means and back into the space to thereby cool the interior of the building.

2. The method of cooling a building which comprises the steps of: circulating a liquid material from liquid storage container apparatus to apparatus outside of the space enclosed by the building to bring the liquid directly into contact with outside air, to thereby lower the temperature of the liquid by evaporation, or radiation, or contact with air cooler than the liquid, or by all of these phenomena; collecting the liquid material and returning it to the liquid storage apparatus after its temperature has been lowered; storing the cooled liquid material in heat-exchange relationship with non-liquid material substantially surrounding said container to thereby cool the non-liquid material; circulating air from the space enclosed by the building in heat-exchange relationship through and around the cooled non-liquid material to thereby cool the air; and returning the cooled air to the space enclosed by the building to thereby cool the building.

3. The method of cooling a building which comprises the steps of: circulating a liquid to apparatus outside of the space enclosed by the building to lower the temperature of the liquid, collecting the liquid after its temperature has been lowered, storing the cooled liquid in a container in heat-exchange relationship with non-liquid material substantially surrounding said container to thereby cool the non-liquid material, circulating air from the building in heat-exchange relationship through and around the non-liquid material which has been cooled to thereby cool the air from the building.

4. Apparatus for use in heating or cooling equipment comprising a storage bin having walls, a top and a bottom, insulation means for a major portion of the walls and top and located with respect to said walls and top so as to reduce leakage of heat to or from the storage bin, the bin containing liquid reservoir means of lesser capacity than the storage bin thus providing a space substantially surrounding the liquid reservoir means inside of the storage bin, means for heating the liquid in said liquid reservoir means, means for circulating the liquid to the exterior of the storage bin for evaporation, radiation or direct exposure to cooler outside air, a non-liquid heat storage material which is non-liquid at low temperatures located in the space and adjacent to the liquid reservoir means, the liquid reservoir means comprising a material capable of transferring heat to or from the liquid reservoir whereby a heat transfer will take place whenever a temperature difference exists between the liquid and non-liquid material, an opening in the storage bin for bringing air into the storage bin for circulation through the non-liquid storage material, and an opening in the storage bin through which the heated air leaves from the storage bin.

5. Apparatus for use in heating or cooling equipment comprising a storage bin having walls, insulation material adjacent the walls of a major portion of said storage bin to retard leakage of heat to or from said storage bin, said bin containing fluid reservoir means, means for heating the fluid in said fluid reservoir means, means for circulating the liquid to the exterior of the storage bin for evaporation, radiation or direct exposure to cooler outside air, said fluid reservoir means comprising a material capable of transferring heat to or from said fluid reservoir means, heat storage material, which is non-fluid at low temperatures, in said bin and in proximity to said fluid reservoir means so that a heat transfer will take place whenever there is a temperature difference between the fluid and the non-fluid material, said non-fluid material and said fluid reservoir means having large areas of surface exposed to air in said storage bin whereby large quantities of heat may be transferred among the various materials and air in said storage bin whenever a temperature difference exists among the materials or between the materials and the air, ductwork comprising a plurality of fluid conduits in said storage bin, said fluid conduits having conduit means connected therewith and extending to the inside of the storage bin from a location outside of the storage bin so that air to be heated or cooled may be introduced into said plurality of fluid conduits, said fluid conduits having openings to permit air being introduced through said conduit means and said fluid conduits to escape into said storage bin and directly into said non-fluid material whereby such air may pass in spaces through said non-fluid material and around said fluid reservoir such that the air temperature will be raised or lowered by the apparatus in said storage bin, and means, leading from a location inside of said storage bin to a location outside of said storage bin, through which air which has been warmed or cooled may flow to the outside of said storage bin.

References Cited by the Examiner

UNITED STATES PATENTS

| 240,267 | 4/1881 | Pope. |
| 2,342,211 | 2/1944 | Newton. |
| 2,396,338 | 3/1946 | Newton _____ 165—18 |
| 2,660,863 | 12/1953 | Gerhart _____ 62—6 |

OTHER REFERENCES

Bliss, R. W. Jr., Fully Solar Heated House, in Air Conditioning, Heating and Ventilating, pp. 92 to 97, Oct. 1955.

Machine Design, Solar Roof Plus Heat Pump Heats or Cools Ranch House, p. 26, Dec. 25, 1958.

ROBERT A. O'LEARY, *Primary Examiner.*
A. W. DAVIS, *Assistant Examiner.*